March 12, 1935.   J. M. CRAWFORD ET AL   1,993,921
STEERING GEAR
Filed Jan. 19, 1934
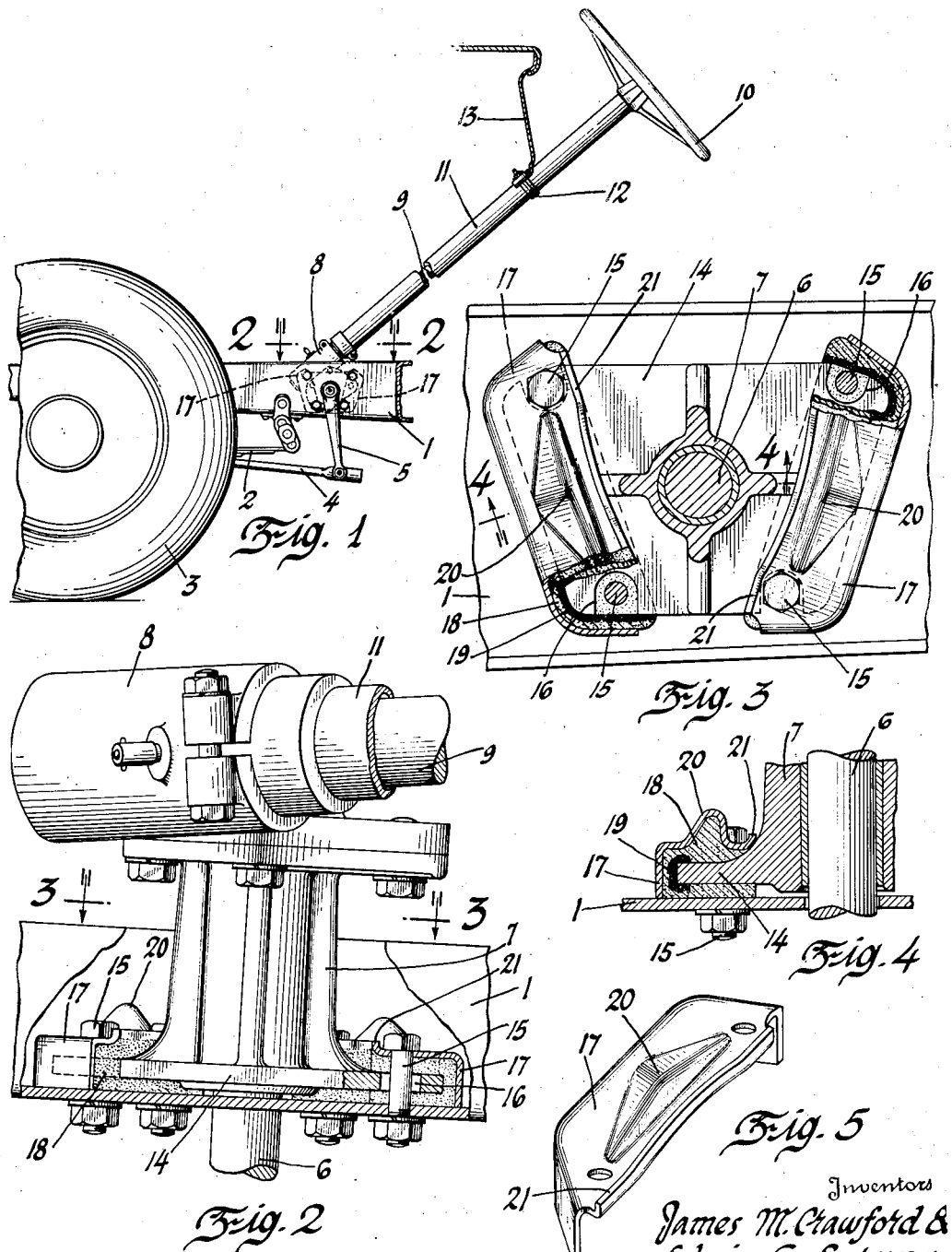
Inventors
James M. Crawford &
Edwin G. Sprung.
By Blackmore, Spencer & Hirl
Attorneys Patented Mar. 12, 1935

1,993,921

UNITED STATES PATENT OFFICE 1,993,921

STEERING GEAR

James M. Crawford and Edwin G. Sprung, Detroit, Mich., assignors to General Motors Corporation, Detroit, Mich., a corporation of Delaware Application January 19, 1934, Serial No. 707,305

6 Claims. (Cl. 280—87)

This invention relates to motor vehicles and more particularly to improvements in steering gear for road vehicles.

The invention aims to reduce the transmission of vibration and road shock to the steering wheel and to cushion forces which would otherwise impose strains on the steering column assembly and to this end contemplates a resilient mounting of the steering column assembly on the chassis frame. The cushion mounting is such as to provide a construction which is both simple in design and inexpensive to manufacture and install, and which frees the steering mechanism from the effects of frame vibration and road wheel reaction.

In the accompanying drawing, Figure 1 is a fragmentary side elevation of a motor vehicle showing a flexibly mounted chassis frame and the steering mechanism associated therewith; Figure 2 is a top plan view of the lower end of the steering column looking down on line 2—2 of Figure 1 with parts in section; Figure 3 is a section taken on line 3—3 of Figure 2 with parts broken away; Figure 4 is a sectional view taken on line 4—4 of Figure 3, and Figure 5 is a detail perspective view of a retainer cup forming a part of the resilient mounting.

Referring to the drawing, the numeral 1 indicates a longitudinal member of the chassis frame supported through a flexible spring 2 on road wheels 3, swiveled at the front end of the frame. The swiveled wheels are connected through suitable steering linkage, including the drag bar 4, connected at its rear end to a swinging pitman arm 5. The swinging arm 5 is fixed or keyed to a rockshaft 6 extending through the chassis frame member 1 with a bearing in a hollow frame bracket 7 and into the gear housing 8 at the lower end of the steering column. Extending upwardly from the gear housing 8 is a steering shaft 9 provided at its upper end with a hand wheel 10 and enclosed within a tubular housing 11. For steadying the upper end of the steering column assembly, a bracket 12 may be employed to clamp the post to the instrument panel 13 or other suitable part of the vehicle body.

In order to mount the lower end of the steering column upon the chassis frame, there is provided the mounting bracket 7, previously referred to, and which is securely bolted to the gear housing 8 and carries at its end an outwardly extending flange 14, the side edges of which are divergently disposed as shown in Figure 3. Anchorage studs 15 pass through enlarged open ended slots 16 in the plate or flange 14 adjacent the divergent edges and rigidly secure to the frame member 1 a pair of cupped stampings 17 providing oppositely disposed pockets to receive the opposite edges of the plate 14. To prevent metal to metal contact between the steering gear and the chassis frame, and accommodate limited relative movement between the plate 14 and the pins 15 passing through the slotted openings in the plate, it is proposed to insert within the pocket provided by the frame cooperating stamping 17, a body 18 of rubber or other elastic deformable cushioning material, which may be in the form of a glove fitted to the sides of the plate 14 over the divergent ends thereof.

If desired, the rubber glove 18 may be molded and vulcanized to either or both the plate 14 and the stamping 17. Furthermore, in order to increase the life of the parts and provide a wear resistant surface, the rubber may be so formed as to be tougher or denser in the base portion thereof that engages the edge of the flange, or as an alternative, this portion of the rubber may have embedded therein fabric cords 19 as shown in the drawing.

An outwardly extending boss or dome 20 on the wall of the stamp boss 17 is preferably provided between the bolt openings to stiffen and reinforce the same and to provide interiorly thereof a locating recess into which the body of rubber 18 may extend. To further reinforce the stamping, an outturned flange 21 may be formed along its inner edge.

From the above description it will be apparent that there is afforded a simple resilient mounting which avoids necessity for extensive changes in conventional and existing structure and which in use serves to free the steering column from frame vibration and shock, and also from damaging strains transmitted from the road wheels flexibly supporting the frame, to the steering column assembly mounted on the frame.

While the invention has been described more or less specifically it will be understood that only one embodiment is illustrated and that various modifications may be made.

We claim:—

1. A road vehicle having steerable wheels, a chassis frame flexibly mounted on the wheels, a steering column assembly having a drag link connection with the wheels, and a cushion mounting between the chassis frame and steering column assembly.

2. In combination, a steering column mounting bracket having an outwardly extending wall, a non-metallic deformable glove fitted to the wall, a support for the bracket engaging one side of said glove, a clamp plate engaging the opposite side of the glove, and securing means fastening said plate to the support and passing loosely through enlarged openings therefor in the wall of the bracket.

3. In combination with a chassis frame member and a steering column mounting plate, of an elastic cushion embracing said plate having the portion thereof engaging the periphery of the plate relatively tougher than the remainder thereof, and means securing the cushion to the frame member.

4. In combination with a chassis frame member and a steering column mounting plate, of a device secured to the frame member and providing a pocket to receive the plate, a rubber insulation member enclosed by the pocket and extending along both sides and across the end of the plate, and fabric cords embedded in the rubber at the end of the plate.

5. In a road vehicle, a chassis frame member, a steering column assembly extending upwardly from said member into the vehicle body compartment and having a gear housing at its lower end, a mounting bracket extending laterally of the housing and terminating in an outwardly extending flange, a pair of oppositely disposed recessed members cooperating with the frame member to provide pockets which receive said flange, fastening bolts joining said members and passing loosely through openings in the flange, and non-metallic deformable material contained within the pockets in embracing relation with the flange.

6. In a road vehicle, a chassis frame member, a steering column assembly extending upwardly from said member and having a gear housing at its lower end, a mounting bracket rigid with said housing, means securing the bracket to the frame member, and rubber insulation interposed between said bracket and frame member.

JAMES M. CRAWFORD.
EDWIN G. SPRUNG.